Figure 1:
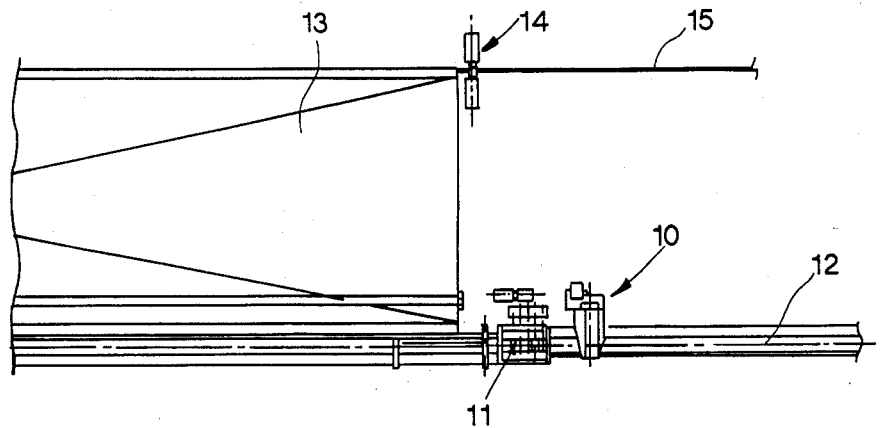

United States Patent [19]

Poloni

[11] Patent Number: 4,621,554
[45] Date of Patent: Nov. 11, 1986

[54] FLYING SHEARS TO SHEAR ROLLED PRODUCTS

[75] Inventor: Alfredo Poloni, Ronchi Dei Legionari, Italy

[73] Assignee: Danieli & C. Officine Meccaniche SpA, Italy

[21] Appl. No.: 675,311

[22] Filed: Nov. 27, 1984

[30] Foreign Application Priority Data

Dec. 9, 1984 [IT] Italy .............................. 83512 A/83

[51] Int. Cl.$^4$ ........................ B23D 25/00; B26D 1/58; B26D 1/60
[52] U.S. Cl. ........................................ 83/317; 83/320
[58] Field of Search ......................... 83/316, 317, 315

[56] References Cited

U.S. PATENT DOCUMENTS 3,156,150 11/1964 Sarka ...................................... 83/317

Primary Examiner—Donald R. Schran
Attorney, Agent, or Firm—Wegner & Bretschneider

[57] ABSTRACT

This invention concerns a flying shears (10) to shear rolled, extruded, drawn and/or like semi-finished products, the shears (10) being able to work on one or more rolled products at one and the same time and comprising support means (18) which are at least partially movable, blade-support means (21-121) able to move in a coordinated manner, means (23-24) to guide the movement of the blade-support means (21-121), and cam means (20) which actuate the blade-support means (21-121), in which flying shears (10) the support means (18) can move along a trajectory substantially parallel to the rolled product, and at least shaft means (19) of the cam means (20) are supported by the support means (18), and the shaft means (19) are spaced apart along an axis substantially perpendicular to the movement of the rolled product.

20 Claims, 4 Drawing Figures

FLYING SHEARS TO SHEAR ROLLED PRODUCTS

This invention concerns a flying shears to shear rolled products. To be more exact, the invention concerns a flying shears able to shear rolled, extruded, drawn and like products during the movement of such products.

For the sake of brevity we shall use the term "rolled product" in this text to indicate such categories of semi-finished products.

The shears of the invention is intended in particular to avoid jamming or other reciprocal axial actions against the rolled product since the shears itself is able to be displaced by such actions.

This prevents the transmission of excessive stresses lengthwise to the rolled material during shearing.

Such stresses may occur since the trajectory of the blades includes a component axial to the rolled product.

A difference between the speed of the blades and the speed of the rolled product in the direction axial to the rolled product can therefore be converted into an axial stress between the blades and the rolled product.

An operating method according to the invention may be required whenever certain types of material are being processed or whenever shearing is undertaken after given processing steps such as the straightening of the rolled products to be sheared, for instance.

Usual flying shears which are equipped with a pair of rotors, each of which has a shearing blade, are known.

Shears are also known in which the blades are operated by connecting rod assemblies or cams. Such blades generally have a speed higher than that of the rolled product in the direction of motion of the latter. In this way there are no problems of interference or jamming against the rolled product upstream. But the tail of the sheared segment downstream from the shears may be bent by the thrust of the blades.

Such bends can be damaging or undesirable in the case of some types of rolled product or of some processing steps.

Shears of a pendular type are known in which the blades are moved by connecting rods actuated by coaxial cams or cranks in the case of both blades.

Such connecting rod assemblies form masses of a pendular type, suitable means being included to damp the motion so as to obviate excessive oscillations.

A disadvantage of such types of shears is that the swinging of the pendular masses always takes place whenever the blades are actuated.

The motion of such pendular masses is unaffected by the motion of the rolled product and does not adapt itself to that motion.

U.S. Pat. No. 1,832,110 is known and discloses a shears in which the blades follow the rolled product during shearing; the return of the support of the blades is driven positively by means of an appropriate mechanism.

U.S. Pat. No. 2,703,614 discloses a shears with a pair of rotors equipped with blades. The whole shears is fitted to a stationary base in a pendular manner; the return to the starting position is obtained with spring means.

DE-A-2.628.688 discloses a shears intended in particular for the shearing of strip; in this shears an element to guide the blades is suspended on an upper guide or rail positioned in the direction of the running of the strip to be sheared.

U.S. Pat. No. 2,261,007 discloses a shears with a movable frame, which in its turn bears a stationary blade and a movable blade.

The movement of the frame and of the movable blade respectively is obtained with a complex mechanism with eccentrics. The purpose of this U.S. patent is to provide a shears with a variable shearing cadence so as to obtain desired lengths of strip and also to provide an adequate spacing between the blades and strip during the back stroke of the blades.

CH 439.066 discloses a shears to cut packaging material, the shears comprising two elements that always travel parallel, but it does not show supports or pendular elements.

DE-A-1.527.034 discloses a flying shears in which both the blades are supported by respective pendular elements the motion of which is actuated in a coordinated manner by means of a kinematic motion assemblage.

It is the purpose of this invention to obviate the possibility of the bending of the rolled product or in any event to obviate transmission of excessive axial stresses between the shears and the rolled product and at the same time to provide a shears having a simple construction and reliable working.

The shears of the invention adapts itself to the movement of the rolled product and is envisaged as being able to yield partially to the components of the stresses which arise from the shearing action and are axial to the movement of the rolled product.

This is obtained by providing movable elements that bear the blades and are fitted to movable support means, which are able to be displaced as a result of any stresses occurring between the blades and rolled product in a direction axial to the rolled product.

Such stresses may occur, in one sense or the other, in the direction of sliding of the rolled product as a result of differences between the speed of the blades and that of the rolled product in such direction.

According to the inventon the movement of the movable support means takes place parallel or substantially parallel to the direction of movement of the rolled product.

During normal working it is visualised that, so as to avoid any jamming, the blades move at a speed slightly higher than that of the rolled product or at a speed at least the same as that of the rolled product.

As a result, on each occasion when shearing takes place, there can be a backward displacement of the aforesaid support means, which are thrust by the reaction of the rolled product against the blades while the rolled product is sheared.

According to a preferred embodiment the support means can be envisaged as being of a pendular or rotatable type; their return to their normal position can be caused by the force of gravity or by return spring means or other equivalent means.

In another embodiment of the invention the support means can comprise carriage means or like means. In this case return means of a resilient nature, for instance, will be included to bring the carriage back to its normal position after each shearing.

Moreover, according to the invention it is envisaged that the shafts which support the cams that actuate the blades will be arranged in such a way as to obtain a substantially balanced motion of the blades and their relative supports.

Equilibration counterweights are provided on the shafts so that the movable support means do not undergo actions (and thus do not undergo displacements) due to the inertia of the rotating masses.

In fact, the movable support means move only during shearing and on the occurrence of reciprocal actions between the blades and the rolled product and move at that time in the direction of movement of the latter.

An advantage of the invention is the avoidance of excessive and undesirable axial stresses on the rolled product during shearing.

The shears of the invention is able to shear a plurality of rolled products arranged parallel to each other at one and the same time. The shears can be employed also to shear rolled products which are halted instead of being in motion.

This invention is therefore embodied with a flying shears to shear rolled, extruded, drawn and/or like semi-finished products, the shears being able to work on one or more rolled products at one and the same time and comprising support means which are at least partially movable, blade-support means able to move in a coordinated manner, means to guide the movement of the blade-support means, and cam means which actuate the blade-support means, the shears being characterized by the facts that the support means can move along a trajectory substantially parallel to the rolled product, and that at least the shaft means of the cam means are supported by the support means, and that the shaft means are spaced apart along an axis substantially perpendicular to the movement of the rolled product.

Figure 2:
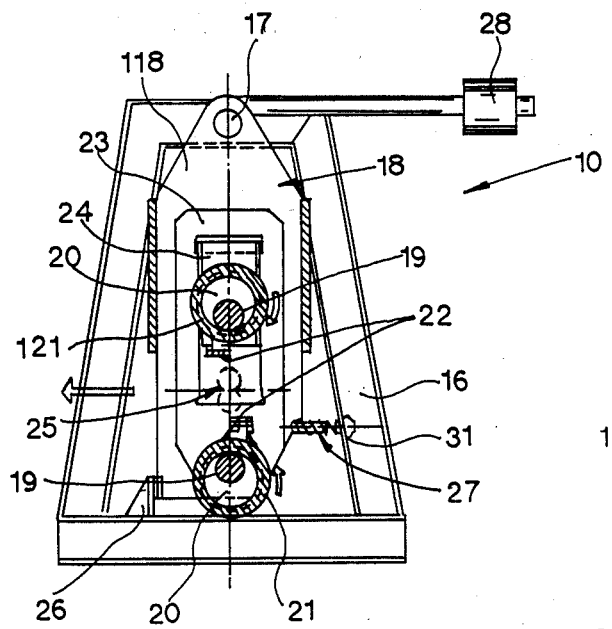
Figure 3:
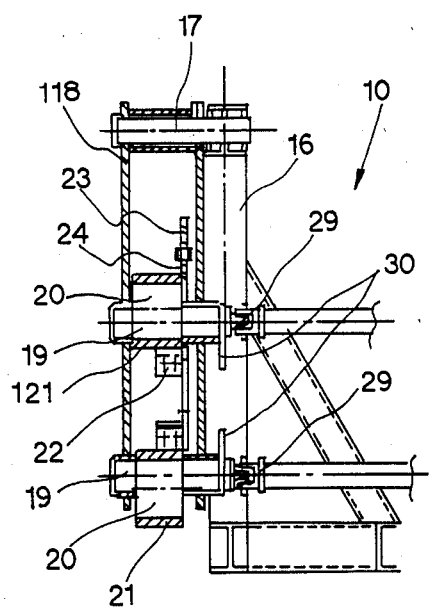

We shall now describe, as a non-restrictive example, a preferred embodiment of the invention with the help of the attached figures, in which:

FIG. 1 shows a possible installation of a flying shears according to the invention;

FIGS. 2 and 3 give partly cutaway views of the preferred embodiment of a flying shears according to the invention.

Figure 4:
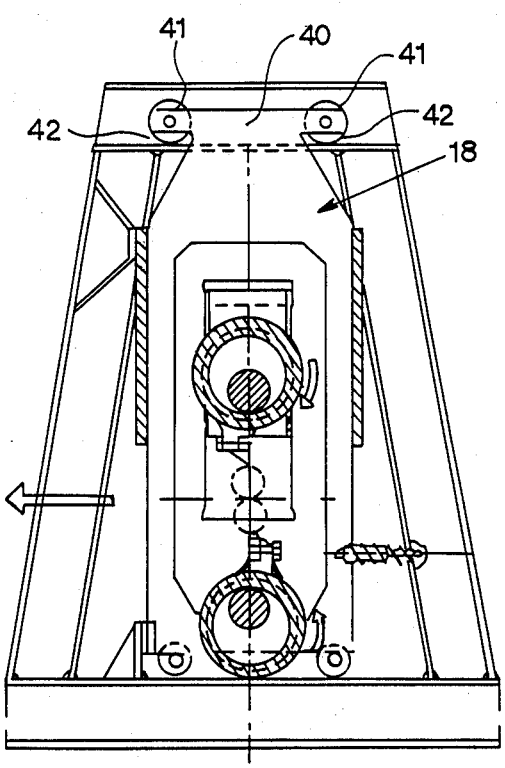

FIG. 4 is a partially cut away view illustrating an alternative to the FIG. 2 embodiment.

In FIG. 1 a flying shears 10 according to the invention is located here downstream from a multiple-feed straightener unit 11, to which the rolled products, whether bars or sections, come from a cooling plate or bed 13.

Downstream from the shears 10 is a conveyor 12 which sends the rolled products, already sheared, to a successive usage means.

The figure also shows a conveyor 15 along which there arrive the hot rolled products delivered from the rolling line to a cooling plate 13.

In this example a unit 14 to brake the tail of the rolled product is included immediately upstream from the cooling plate 13.

The positioning of the flying shears 10 downstream from the straightener unit 11 enables a plurality of rolled products, arriving from the cooling plate 13 and passing along the conveyor 12, to be sheared.

In FIGS. 2 and 3 the shears 10 comprises a frame 16 and movable support means 18. In the example shown the means 18 consist of a pendular support 118 rotatably secured at its upper end at 17 to the frame 16.

The pendular support means, or pendulum, 118 sustains in a known manner two shafts 19 with cams 20 and equilibration counterweights 30.

The shafts 19 get their motion through universal joints and shafts 29 of a known type from motor/reduction gear means, which have not been shown here as they are known and do not form part of the invention.

The cams 20 actuate a lower blade support 21 and upper blade support 121 together with blades 22.

In the figures the supports 21-121 are solidly fixed respectively to a guide means, or guide, 23 and to a slide means, or slide, 24.

The slide 24 and guide 23 can slide reciprocally in a vertical direction, but cannot slide horizontally in relation to each other.

When the blade supports 21-121 move eccentrically and in opposite directions, the guide 23 and slide 24 slide reciprocally in a vertical direction and swing sideways but always remain parallel.

In this way a guided and substantially circular motion is imparted to the blades 22, of which the trajectories are indicated with 25 and with lines of dashes.

The pendulum 118 may comprise abutment means, such as a resilient catch 26 for instance, which may consist of rubber or be equipped with springs or other equivalent means.

It is possible to provide the pendulum 118 with damper or cushioning means 27 located, for instance, between the pendulum 118 and the frame 16 and suitable for obviating excessive swinging of the pendulum 118.

So as to compensate for the thrust due to shearing, which tends to make the pendulum 118 retreat and pivot anticlockwise at 17, counterweights can be provided, such as the counterweight 28 in FIG. 3, and may possibly cooperate with return spring means, such as means 31 in FIG. 2, or else return spring means 31 alone may be provided.

The choice of counterweight means and/or resilient means will depend on the dynamic characteristics which it is desired to impart to the return of the pendulum 118.

According to a variation of the FIG. 2 embodiment, as illustrated in FIG. 4, moveable support means 18 includes a carriage 40 having a space pair of wheels 41 which grow on guides or rails 42 in a same manner as in the FIG. 2 embodiment the support means can be equipped with a resilient return means where the return of the carriage and support mean to its initial position after each shearing cycle. In all other respects the construction of the FIG. 4 embodiment is the same as that shown in FIG. 2.

The function of such resilient return means is analogous to the action of the force of gravity on the pendulum support means 118 (FIGS. 2 and 3), possibly supplemented by a resilient action 31, as we said before.

I claim:

1. A flying shears for shearing rolled products and capable of working on one or more rolled products at the same time comprising:
    shearing blades,
    blade support means carrying said shearing blades and capable of moving in a coordinated manner,
    means for guiding the movement of said blade support means,
    cam means for driving said blade support means through a rotational path,
    drive shaft means extending along an axis substantially perpendicular to the direction of movement of rolled product, communicating mechanical energy to said cam means, and moveable support means supporting said drive shaft means, said moveable support means being movable along a trajectory substantially parallel to that of the rolled product.

2. The flying shears of claim 1, wherein said support means comprise at least a pendular support means.

3. The flying shears of claim 2, wherein said pendular support means is rotatably connected to stationary frame means.

4. The flying shears of claim 1, wherein said support means comprise at least carriage means.

5. The flying shears of claim 1, wherein said means for guiding movement of said blade-support means include at least a guide means solidly fixed to one blade support means and a slide means solidly fixed to another blade-support means and slidably cooperating with said guide means.

6. The flying shears of claim 2, wherein said means for guiding movement of said blade-support means include at least a guide means solidly fixed to one blade-support means and a slide means solidly fixed to another blade-support means and slidably cooperating with said guide means.

7. The flying shears of claim 3, wherein said means for guiding movement of said blade-support means include at least a guide means solidly fixed to one blade-support means and a slide means solidly fixed to another blade-support means and slidably cooperating with said guide means.

8. The flying shears of claim 4, wherein said means for guiding movement of said blade-support means include at least a guide means solidly fixed to one blade-support means and a slide means solidly fixed to another blade-support means and slidably cooperating with said guide means.

9. The flying shears of claim 1, wherein said blades have a substantially circular motion.

10. The flying shears of claim 2, wherein said blades have a substantially circular motion.

11. The flying shears of claim 3, wherein said blades have a substantially circular motion.

12. The flying shears of claim 4, wherein said blades have a substantially circular motion.

13. The flying shears of claim 5, wherein said blades have a substantially circular motion.

14. The flying shears of claim 6, wherein said blades have a substantially circular motion.

15. The flying shears of claim 7, wherein said blades have a substantially circular motion.

16. The flying shears of claim 8, wherein said blades have a substantially circular motion.

17. The flying shears of claim 1, wherein said cam means get their motion through shafts and universal joints.

18. The flying shears of claim 2, wherein said cam means get their motion through shafts and universal joints.

19. The flying shears of claim 3, wherein said cam means get their motion through shafts and universal joints.

20. The flying shears of claim 4, wherein said cam means get their motion through shafts and universal joints.

* * * * *